BEST AVAILABLE COPY

Sept. 16, 1941. H. M. GEHM Des. Re. 21,900

JAR

Original Filed March 24, 1941

Harold M Gehm
INVENTOR

BY Rule & Hoge
ATTORNEYS

BEST AVAILABLE COPY

Reissued Sept. 16, 1941

Des. Re. 21,900

UNITED STATES PATENT OFFICE 21,900

DESIGN FOR A JAR

Harold M. Gehm, Alton, Ill., assignor to Owens-Illinois Glass Company, Toledo, Ohio, a corporation of Ohio Original No. 126,977, dated May 6, 1941, Serial No. 99,815, March 24, 1941. Application for reissue July 24, 1941, Serial No. 102,456. Term of patent 14 years

*To all whom it may concern:*

Be it known that I, Harold M. Gehm, a citizen of the United States, residing at Alton, in the county of Madison and State of Illinois, have invented a new, original, and ornamental Design for a Jar, of which the following is a specification, reference being had to the accompanying drawing, forming a part thereof.

Figure 1:
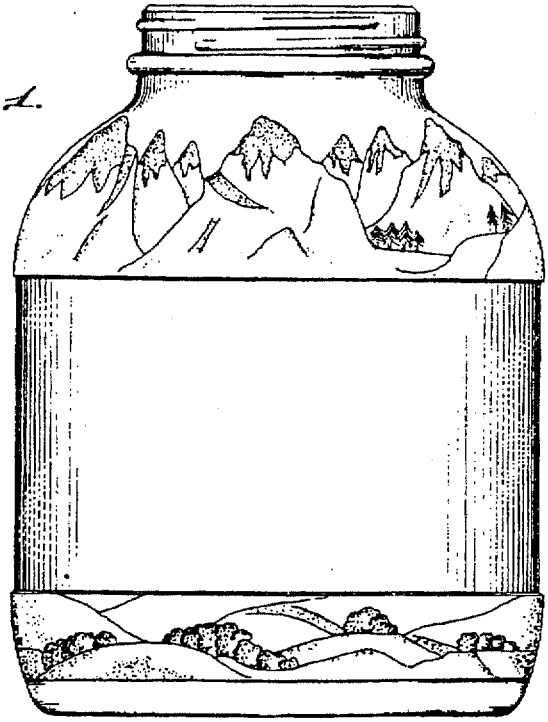
Fig. 1 is a side elevational view of a jar showing my new design.
Figure 2:
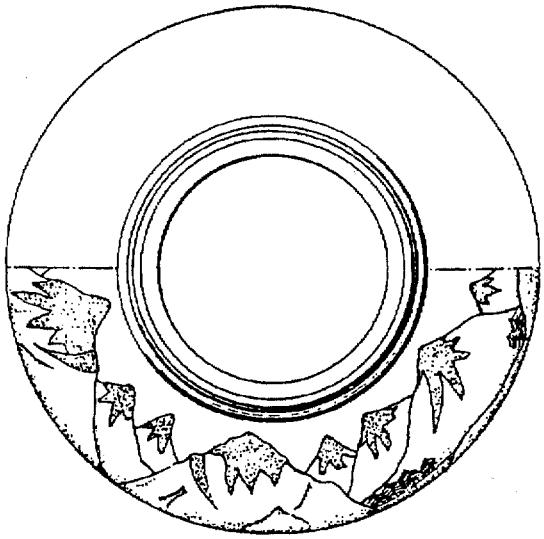
Fig. 2 is a top plan view illustrating a portion of the shoulder decoration.

The surface decorations illustrated are repeated on the opposite side of the jar.

I claim:

The ornamental design for a jar, substantially as shown and described.

HAROLD M. GEHM.